United States Patent [19]

Smith et al.

[11] Patent Number: 5,163,049

[45] Date of Patent: Nov. 10, 1992

[54] METHOD FOR ASSURING DATA-STRING-CONSISTENCY INDEPENDENT OF SOFTWARE

[75] Inventors: Clarence S. Smith, Glendale; Larry J. Yount, Scottsdale, both of Ariz.

[73] Assignee: Honeywell Inc, Minneapolis, Minn.

[21] Appl. No.: 565,362

[22] Filed: Aug. 10, 1990

[51] Int. Cl.[5] .............................................. H04J 3/26
[52] U.S. Cl. ..................................... 370/94.1; 370/60
[58] Field of Search ................. 370/60, 60.1, 61, 85.1, 370/85.6, 94.1, 110.1, 118; 340/825.5, 825.51, 825.52

[56] References Cited

U.S. PATENT DOCUMENTS

| | | | |
|---|---|---|---|
| 4,354,263 | 10/1982 | Bordry et al. | 370/94.1 |
| 4,601,586 | 7/1986 | Bahr et al. | 370/94.1 |
| 4,638,477 | 1/1987 | Okada et al. | 370/94.1 |
| 4,777,595 | 10/1988 | Strecker et al. | 370/94.1 |
| 4,933,846 | 6/1990 | Humphrey et al. | 370/85.1 |

*Primary Examiner*—Benedict V. Safourek
*Assistant Examiner*—Alpus H. Hsu
*Attorney, Agent, or Firm*—Dale E. Jepsen; Donald Lenkszus

[57] ABSTRACT

An improved distributed processing system for controlling the transfer of data between a terminal controller and a subsystem is described where the improvement insures wordstring consistency in a manner which is completely transparent to the subscriber subsystem. In particular, data is transferred, via a dual-bank, dual-port terminal memory where the bank selection is controlled such that any wordstring transfers between the terminal memory and the terminal controller are constrained to involve a different bank than transfers between the terminal memory and its associated subscriber subsystem. A wordstring log associated with control arbitration logic contains the dynamic state of the bank assignments for each wordstring. Two flag bits in the wordstring log provide information to the control/arbitration logic, allowing it to manage the bank selection of the terminal memory.

8 Claims, 3 Drawing Sheets

METHOD FOR ASSURING DATA-STRING-CONSISTENCY INDEPENDENT OF SOFTWARE

BACKGROUND OF THE INVENTION

I. Field of the Invention

This invention relates generally to apparatus for coupling a plurality of terminal devices to a serial digital data bus, and more particularly to terminal controller apparatus for receiving and transmitting wordstrings on a time division multiplexed basis between multiple terminal devices on a non-interfering basis.

II. Discussion of the Prior Art

It is well known in the art to employ digital data buses to provide for communication between a multiplicity of digital computers or digital subsystems. In such a system, a multiplicity of terminal controllers are arranged on a time division multiplexed serial bus where the terminal controllers coordinate traffic between the various subscribers on the bus. In such systems, it is typical to communicate by converting all messages into one or more packets, each packet having a format comprising an address heading, date and error correction code, wherein the packet format is defined by the data bus protocol. Each terminal controller thus communicates with the bus and additionally with its own subscriber which may be a computer or other digital subsystem. Such a system must have a positive control means to assure data integrity from a source of data (subscriber A) through the data bus to a destination (subscriber B).

This invention relates to an improved method of assuring data integrity at the interface between a subscriber and terminal controller. An exemplary data bus for which this invention is especially applicable is known as "ARINC 629", which is an emerging standard for a new data bus for the air transport industry. It is best described at this time by a paper entitled "Draft Four of Project Paper 629 Multi-transmitter Data Bus Part I Protocol Description" dated Sep. 3, 1987, and prepared by the Airlines Electronic Engineering Committee. The ARINC 629 standard defines a linear bidirectional serial data bus as well as a data bus terminal controller. The data bus terminal controller is responsible for the physical layer and the protocol layer of the data bus as those terms are defined by the International Organization for Standardization (ISO) Open Systems Interconnection (OSI) reference model as described in ISO 7498. An example of such a terminal controller is the autonomous data bus terminal PD 65150R-080 manufactured by the NEC Corporation of Japan.

All ARINC 629 messages are comprised of one or more packets referred to as "wordstrings". Communication of wordstrings between the subsystem and the terminal controller is via the terminal memory. A separate region of memory is used for each type of wordstring based on data type, source of data and destination of data. Terminal memory can thus be viewed as a mail box having specified regions of memory for incoming and outgoing mail on the basis of the addressee.

The transmission of a wordstring from subsystem A to subsystem B is typically accomplished by the following steps: (1) Subsystem A writes the wordstring data to the region of terminal memory defined for a wordstring destined for subsystem B. (2) Terminal controller A autonomously transmits an address header hereinafter referred to as a "label word", identifying terminal B as the destination of the wordstring followed by the data read from terminal memory A. (3) Terminal controller B, upon recognizing the label word, strips the label word and transfers the data transmitted by terminal controller A into the specified region of terminal memory B. (4) When terminal controller B has completely received the wordstring, it generates a vectored interrupt to subsystem B to inform it that data is available in terminal memory.

From the foregoing it can thus be seen that there is a need to control communication to assure consistency of wordstring data. Specifically, a subsystem must be prevented from writing a new outgoing wordstring to the terminal memory before the terminal controller has completed the transmission of the present wordstring. Similarly, the subsystem must be prevented from reading a wordstring from the terminal memory before the terminal controller has completed the receipt. In the prior art, this problem has been solved using software resident in the processing section of the subsystem. Specifically, a flag was read by software to determine whether a wordstring was in the midst of either reception or transmission. If activity is detected, the processing system is forced to defer access to the data until the data activity (transmission or reception) is complete. This solution causes the processing system to defer access to data if the flag is set, thus putting the burden on the processing section throughput. The potential also exists for the processing section to establish a beat frequency with the terminal and the reading of the flag, thus causing the appearance of a flag always being set for a particular wordstring.

SUMMARY OF THE INVENTION

The present invention provides an improved means to control the transfer of data between a terminal controller and a subsystem which assures wordstring consistency in a manner completely transparent to the subsystem. Data is transferred via a dual-bank, dual-port terminal memory. Bank selection is controlled to assure that any wordstring transfers between the terminal memory and the terminal controller involve a different bank than transfers between the terminal memory and the subsystem. This mode of operation assures data-string-consistency while allowing concurrent access to the terminal memory by either the subsystem or the terminal controller. Control/arbitration logic maintains a wordstring log which contains the dynamic state of the bank assignments for each wordstring. Two flag bits in the wordstring log, the T-bit and the S-bit, provide information to the control/arbitration logic to enable it to manage the bank selection of the terminal memory.

DESCRIPTION OF THE DRAWINGS

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
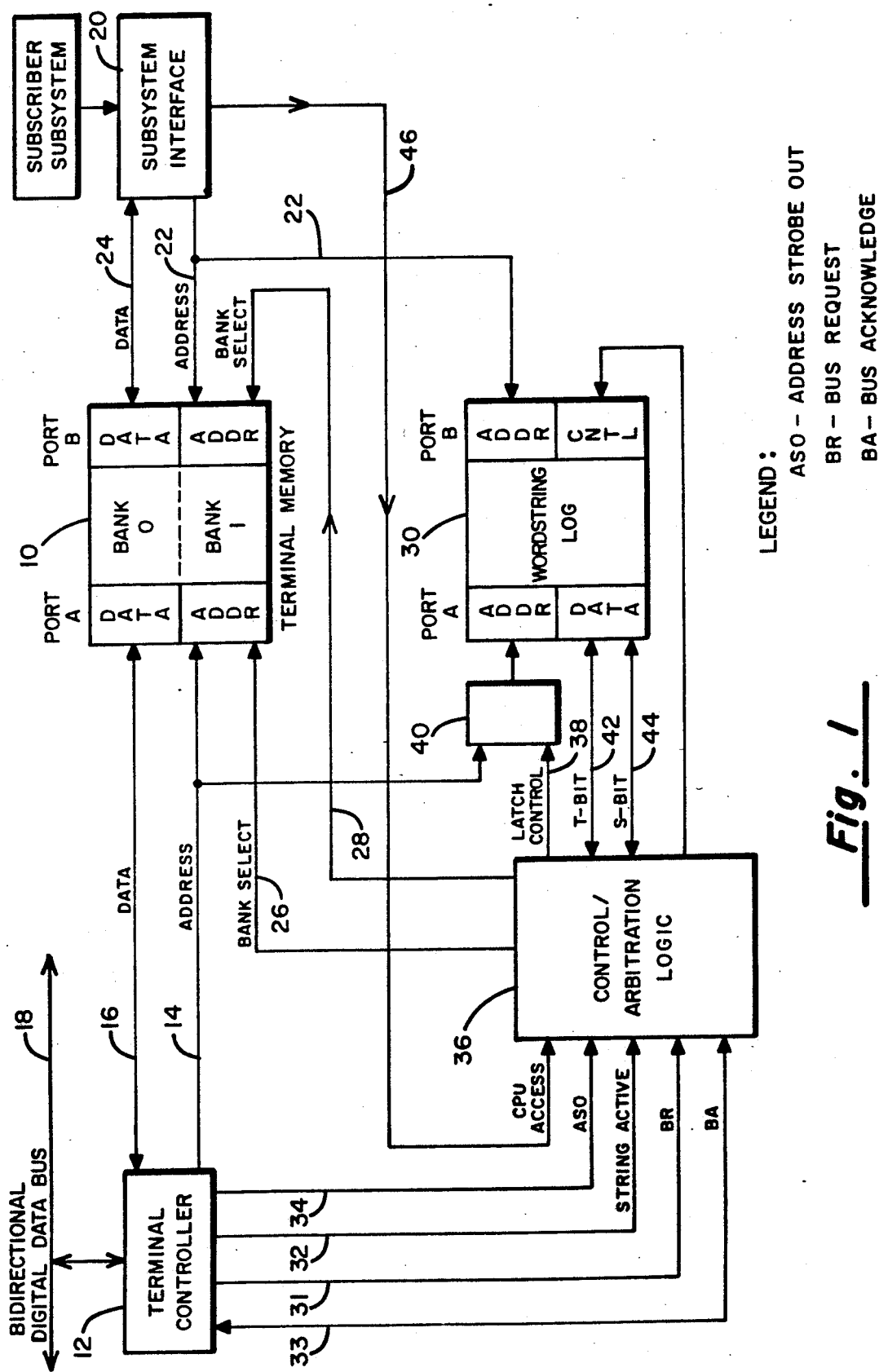
FIG. 1 is a block diagram showing the general organization of the system components in accordance with the present invention.

FIG. 1 shows a block diagram of a first illustrative embodiment of the present invention. Indicated by numeral 10 is a 2048 word 16-bit dual-port static random access memory (RAM) referred to as "terminal memory". Connected to terminal memory 10 is a terminal controller 12 which may be a NEC PD65150R-080 integrated circuit. Data is transferred between terminal controller 12 and Port A of terminal memory 10 in a conventional manner using address bus 14 and data bus 16. Terminal controller 12 communicates with other nodes in the network, via a bidirectional digital data bus 18.

Subsystem interface 20 provides an interface to the subscriber subsystem which may be a computer. Data is transferred between subsystem interface 20 and Port B of terminal memory 10 in a conventional manner using address bus 22 and data bus 24. Address buses 14 and 22 provide address bits 0 through 9 to select any word within a 1024 word bank, via their respective ports. Bank select lines 26 and 28 provide address bit 10 for Ports A and B, respectively, to select between bank 0 and bank 1. Wordstring log 30 is preferably a 1024 word two-bit dual-port static RAM. Thus, for each of the 1024 words which comprise one bank of terminal memory 10, there is a corresponding word in the wordstring log 30. The contents of the wordstring log are the T and the S flag bits. During system initialization, all bits of wordstring log 30 are set to "0".

Consider first the receipt of a wordstring by terminal controller 12. Terminal controller 12 continuously monitors the data present on digital data bus 18. When it recognizes a valid label for which it is the destination, it translates that label into a wordstring starting address, i.e., the address in terminal memory 10 at which the first word of the wordstring is to be stored. Terminal controller 12 also asserts the "bus request" line 31 to indicate that it wants to access the terminal memory 10. Upon sensing the "bus request" has been asserted, control/arbitration logic 36 generates a bus acknowledge signal on line 33 back to the terminal controller 12 to indicate that it may proceed with its request. At a time just after the terminal controller 12 asserts "address strobe out" line 34 to indicate that the address for the data transfer is valid. Terminal controller 12 also asserts the "string active" line 32 to indicate wordstring transmission activity. Upon sensing the first address strobe out by using the relationship of string active line to the bus request line, control/arbitration logic 36 generates a latch control signal on line 38 to capture the starting address of the wordstring in latch 40.

The output of latch 40 provides an address, via Port A, to the wordstring log 30. Thus, the flag bits on lines 42 and 44 corresponding to the T-bit and S-bit, respectively, for the first wordstring are read from the wordstring log. Since the wordstring log has been initialized to "0", the value of the T-bit now read is "0", causing control/arbitration logic 36 to generate a bank 0 select signal on line 26. Thus, the first word of the wordstring and all subsequent words of that string will be written into bank 0 of terminal memory 10.

Terminal controller 12 continues word-by-word to transfer the wordstring to the terminal memory while continuing to assert the string active line. When the last word of the current wordstring has been stored in terminal memory 10 as determined by "string active" line being dropped. This causes control/arbitration logic 36 to write the compliment of the T-bit back to the wordstring log at the address contained in latch 40, i.e., the starting address of the wordstring. At the same time, the S-bit is written to a "1", indicating that this word is the start of that wordstring. When terminal controller 12 next receives a wordstring with the same destination label, it will be written to the same starting address; however, it will now be directed to bank 1 since the T-bit has been set. For a given type of wordstring, terminal controller 12 will thus alternate writing to bank 0, then to bank 1, since the T-bit associated with each wordstring type is always toggled at the completion of a string activity.

Next consider the case where the subscriber subsystem reads the wordstring just loaded into the terminal memory 10 by terminal controller 12. The address of the first word of the wordstring is provided by the subsystem interface 20 on address bus 22. At the same time, subsystem interface 20 asserts the CPU access line 46 to indicate the start of a memory cycle. Address bus 22 provides the address to Port B of the wordstring log 30 to provide the T and S flag bits associated with that string to control/arbitration logic 36. Since this first access is the beginning of a wordstring and terminal controller 12 has set the S-bit in the wordstring log at the beginning of the wordstring, the control/arbitration logic 36 now senses, via line 44, that the S-bit is set and also, via line 42, that the T-bit is set. This information is used to control the state of a latch (not shown) which determines the bank select signal on line 28. With the T-bit set, the bank select signal is low such that the data read by the subsystem interface 20, via data bus 24, will come from bank 0, i.e., the bank that received the wordstring from terminal controller 12.

When the subsystem accesses the second address of the wordstring, the wordstring log 30 is again accessed. However, the value of the log is now "0" for both the T-bit and the S-bit, since these flags are only written at the starting address of a wordstring. Thus, the latch controlling the signal on bank select line 28 is unchanged and the data continues to be read from bank 0. The subsystem is thus directed to the correct terminal memory bank by control/arbitration logic in a manner completely transparent to the subsystem. Since this bank direction is based on a T-bit flag stored in the wordstring log at the end of each terminal controller string activity, it is clear that all potential conflict between subsystem accesses and terminal controller access is eliminated. Terminal controller 1 is free to begin writing another wordstring of the same type into bank 1 while the subsystem is emptying bank 0.

Data transfers from the subsystem tied to subsystem interface 20 to the terminal controller operate in the same way. Table A below shows an example of what the contents of the wordstring log might be at some arbitrary point in message traffic. Note that flag bits are set only in words which correspond to the start of a wordstring.

TABLE A

| T-BIT | S-BIT | |
|---|---|---|
| 0 | 1 | start of wordstring, BANK 0 for Terminal |

TABLE A-continued

| T-BIT | S-BIT | |
|---|---|---|
| | | Controller accesses |
| 0 | 0 | |
| 0 | 0 | |
| 0 | 0 | |
| 0 | 1 | start of wordstring, BANK 0 for Terminal Controller accesses |
| 0 | 0 | |
| 0 | 0 | |
| 1 | 1 | start of wordstring, BANK 1 for Terminal Controller accesses |
| 0 | 0 | |
| 0 | 0 | |
| 1 | 1 | start of wordstring, BANK 1 for Terminal Controller accesses |
| 0 | 1 | start of wordstring, BANK 0 for Terminal Controller accesses |
| 0 | 0 | |
| . | | |
| . | | |
| . | | etc. |

Figure 2:
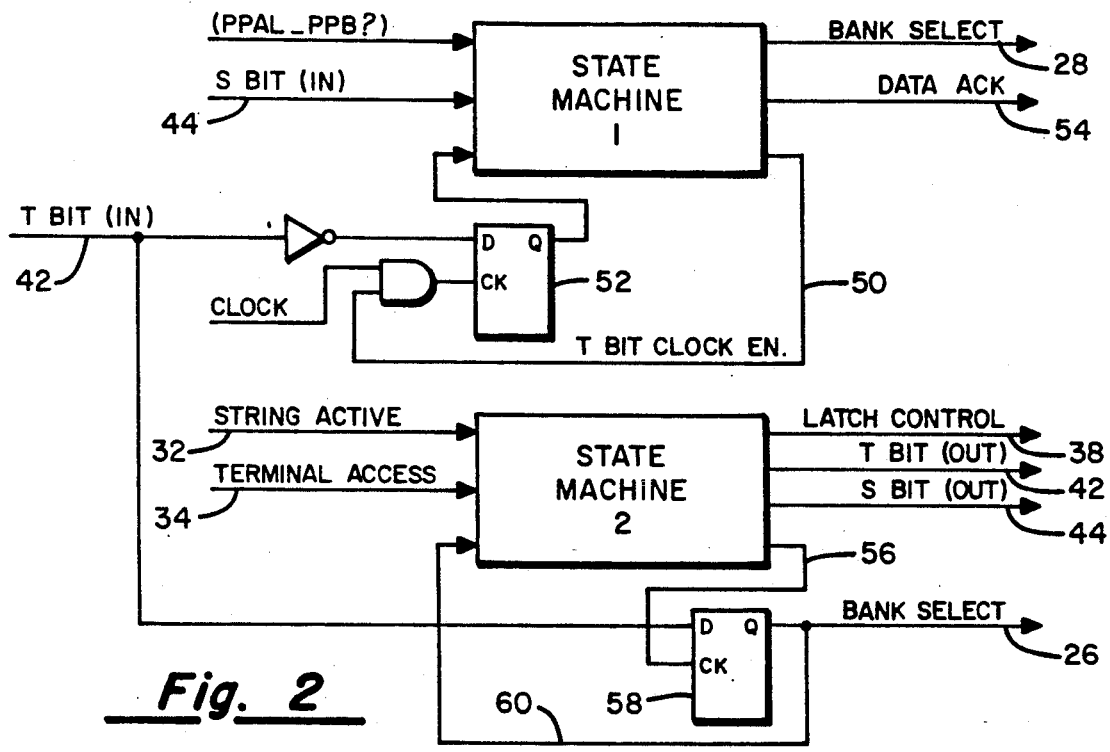
FIG. 2 is a more detailed block diagram of the control arbitration logic.

FIG. 2 shows one way of implementing the control-/arbitration logic 36 using state machine architecture. State machines may be constructed in a well-known manner using programmable logic arrays (PLA).

State machine 1 is used to generate bank select signal on line 28 to control data transfers between the subsystem and the terminal memory while state machine 2 is used to generate bank select on line 26 to control transfers between the terminal controller and the terminal memory. State machine 2 additionally generates the signals required to control and interrogate the wordstring log.

Figure 3:
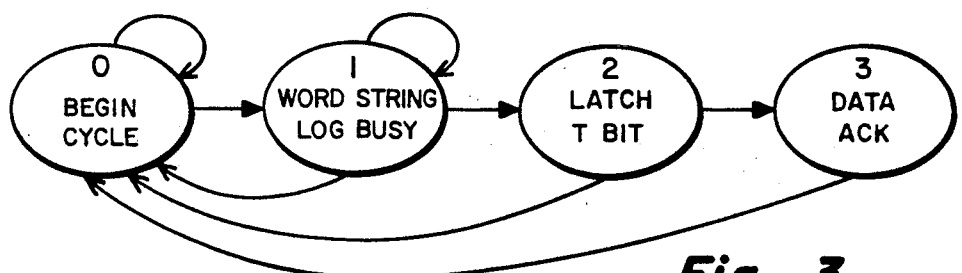
FIG. 3 is a state diagram for state machine 1 of FIG. 2.

FIG. 3 is state diagram for state machine 1 of FIG. 2. State machine 1 is normally in state 0 (begin cycle) waiting for a subsystem bus request. A subsystem bus request causes a transition from state 0 to state 1 (wordstring log busy). State machine 1 loops in state 1 until it senses that the wordstring log 30 is available to be read. This causes a transition from state 1 to state 2 (latch T-bit). The state of the S-bit flag stored in the wordstring log is sensed on line 44. If the S-bit had been set, state 2 will assert the T-bit clock enable line 50 to cause latch 52 to assume the state of the T-bit flag from the wordstring log. Once latch 52 has been set, it remains set until another S-bit flag is encountered. From state 2 there is an unconditional transition first to state 3 during which a "data acknowledge" signal is generated on line 54 and then to state 0 (begin cycle). The "data acknowledge" signal identifies that the data on the data bus 24 is now valid.

Figure 4:
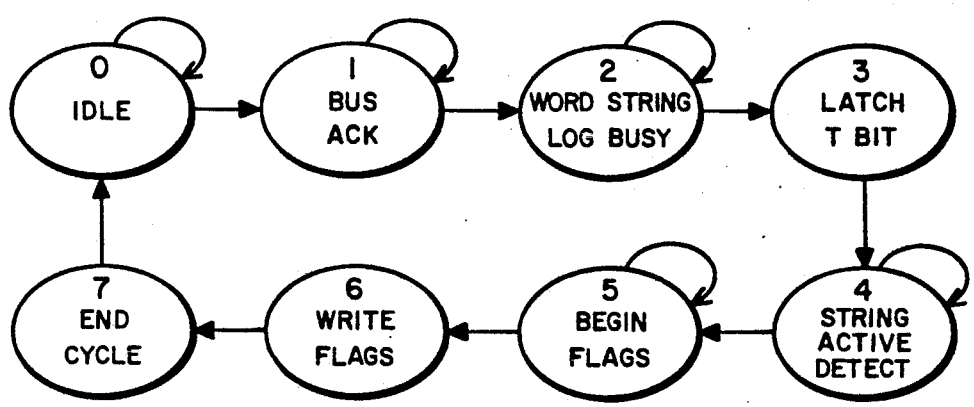
FIG. 4 is a state diagram of state machine 2 of FIG. 2.

FIG. 4 shows a state diagram for state machine 2 of FIG. 2. State machine 2 is normally in state 0 (idle) waiting for a terminal access signal on line 34 (FIG. 1). This signal causes a transition from state 0 to state 1 (bus acknowledge). State machine 2 remains in state 1 until "address stroke out" line 34 is asserted, then dropped, which causes a transition from state 1 to state 2 (wordstring log busy). State machine 2 remains in state 2 until the wordstring log is available upon which it transitions from state 2 to state 3 (latch T-bit). State 3 causes line 56 of FIG. 2 to be asserted to latch the value of the T-bit flag from the wordstring log into latch 58. The output of latch 58 provides the bank select signal on line 26. This output is also provided as an input to state machine 2, via line 60. State 3 unconditionally transitions to state 4 (string active detect). State machine 2 remains in state 4 for the entire period during which terminal controller 12 transfers the wordstring to or from terminal memory 10. At the end of this transfer, the string active line 32 goes low causing a transition from state 4 to state 5 (begin flags). State machine 2 loops in state 5 until it senses that wordstring log 30 is available in order to transition to state 6 (write flags). During state 6, the new values of the T-bit and S-bit flags are written back to the wordstring log. The transitions from state 6 to state 7 and from state 7 to state 0 are unconditional. The new value of the T-bit flag is the compliment of the previous T-bit value provided by input 60.

Figure 5:
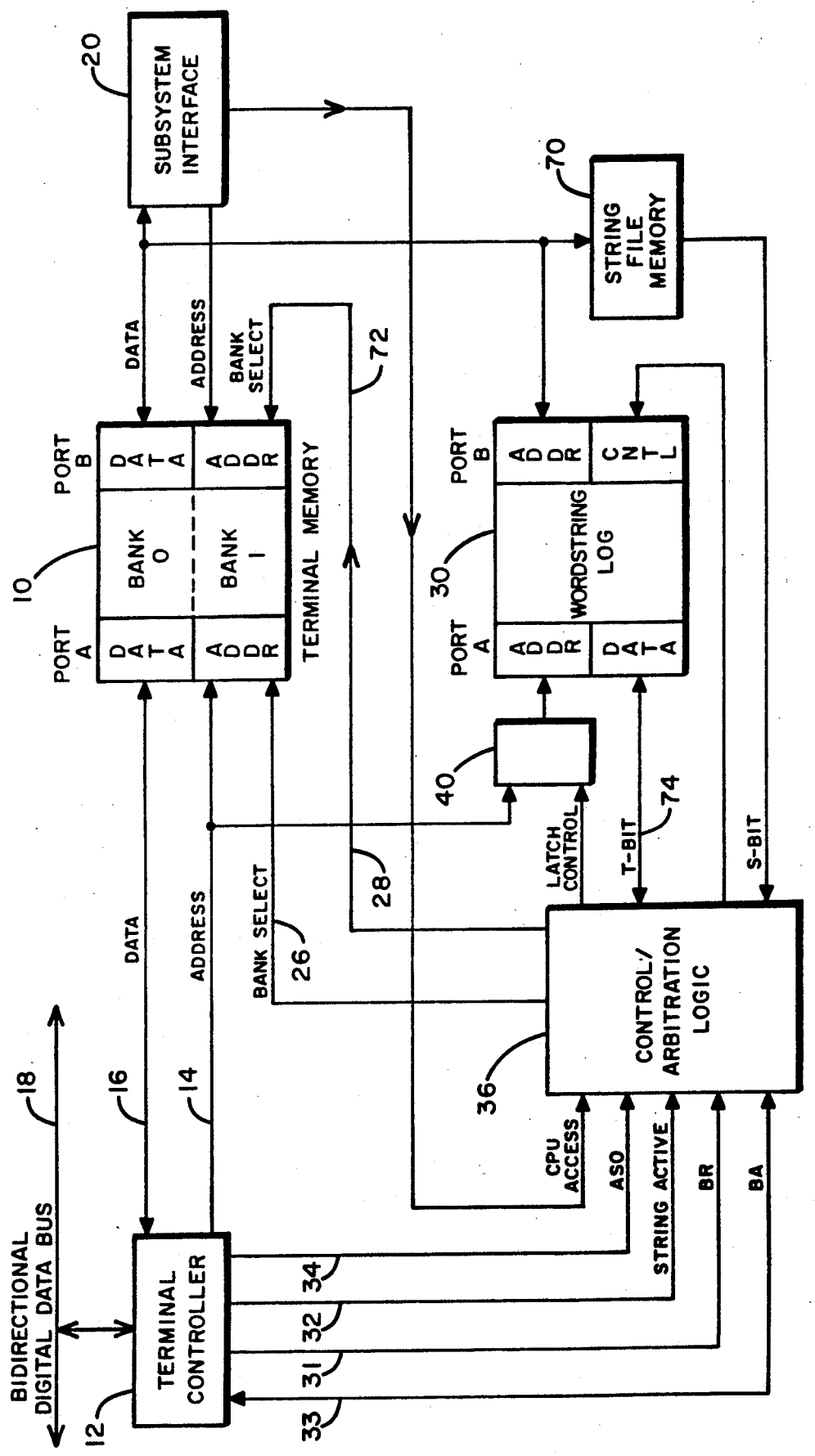
FIG. 5 is a second embodiment of the invention.

FIG. 5 shows another embodiment of the invention. For this embodiment, the S-bit is contained in the string file memory 70 which is either a hard file (i.e., PROM, EPROM, etc.) or a writable device (i.e., RAM, EE-PROM, etc.) which is initialized prior to any access of the terminal memory. This embodiment uses a different means to generate the Port B bank select signal on line 72. The bank select signal on line 72 is generated by the subsystem which determines the correct state for the signal by first reading the value of the T-bit from the wordstring log, via line 74. To access the correct bank of terminal memory 10 for either a read or a write, the subsystem must first read the T-bit flag from the address corresponding to the first address of the wordstring. For each word transferred to or from the terminal memory, the control/arbitration logic generates bank select signal 72 which is the compliment of the T-bit read from the wordstring log.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a distributed data processing system of the type including a plurality of subscribers, each subscriber operatively coupled to an autonomous terminal controller (ATC), each of said ATCs including a terminal memory partitioned into a first and second bank, each of said ATCs communicating over a serial data bus using a packet protocol, a method for assuring data integrity at the interface between any one of said subscribers and its associated ATC comprising the steps of:

(a) transferring a first packet from a first of said plurality of subscribers to a first terminal memory;
   (b) decoding a portion of said first packet using a decoding means for generating an output corresponding to said portion, said decoding means selecting one of said first or second banks of said first terminal memory as a function of said output;
   (c) writing said first packet into said selected bank of said first terminal memory; and
   (d) transferring said first packet from said selected bank of said first terminal memory to said serial data bus while concurrently transferring a second packet from said first of said plurality of subscribers to said other unselected bank of said first terminal memory.

2. The method as in claim 1 and further including the steps of:

(e) transferring said first packet from said serial data bus to a first bank of a second terminal memory while transferring a third packet in a second bank of said second terminal memory to a second of said plurality of subscribers.

3. In a distributed data processing system of the type including a bi-directional digital data bus; a plurality of subscriber subsystems; a plurality of autonomous terminal controllers independently coupling said plurality of subscriber systems to said bi-directional digital data bus whereby digital data in a packet protocol may be transmitted from one subscriber system to another; each of said autonomous terminal controllers including a terminal memory partitioned into first and second banks for storing digital data at addressable locations therein; the improvement comprising:
  (a) means for transferring a first packet from a first of said plurality of subscriber subsystems to one of said banks of a first terminal memory;
  (b) means for decoding a portion of said first packet and generating an output corresponding to said portion, said means for decoding selecting one of said banks of said first terminal memory as a function of said output;
  (c) means for writing said first packet into said selected bank of said first terminal memory; and
  (d) means for transferring said first packet from said selected bank of said first terminal memory to said bi-directional data bus while concurrently transferring a second packet from said first of said plurality of subscriber subsystems to said unselected bank of said first terminal memory.

4. The distributed data processing system as in claim 3 and further including:
  (e) means for transferring said first packet from said bi-directional data bus to a first bank of a second terminal memory while transferring a third packet in a second bank of said second terminal memory to a second of said plurality of subscriber subsystems.

5. The distributed data processing system as in claim 3 wherein said means for decoding comprises discrete components to form an arbitration logic circuit.

6. The distributed data processing system as in claim 5 wherein said arbitration logic circuit comprises a decoder which decodes an address portion of said digital data, and further comprises a selector responsive to said decoder for enabling said first and second banks of said first terminal memory depending on the decoded address portion of said digital data.

7. The distributed data processing system of claim 6 wherein said decoder comprises a wordstring log including a memory integrated circuit.

8. The distributed data processing system of claim 7 wherein said memory integrated circuit is a dual-port static RAM.

* * * * *